United States Patent
White

(10) Patent No.: US 7,472,090 B1
(45) Date of Patent: Dec. 30, 2008

(54) METHOD AND SYSTEM FOR PROVIDING A HIGHER CREDIT LIMIT TO A CUSTOMER

(75) Inventor: Robert D. White, Midlothian, VA (US)

(73) Assignee: Capital One Financial Corporation, Falls Church, VA (US)

( * ) Notice: Subject to any disclaimer, the term of this patent is extended or adjusted under 35 U.S.C. 154(b) by 1264 days.

(21) Appl. No.: 10/335,366

(22) Filed: Dec. 31, 2002

(51) Int. Cl.
G06Q 40/00 (2006.01)

(52) U.S. Cl. .............................. 705/38; 705/35; 705/37; 705/39

(58) Field of Classification Search .................... 705/35, 705/37, 38, 39
See application file for complete search history.

(56) References Cited

U.S. PATENT DOCUMENTS

| | | | | |
|---|---|---|---|---|
| 5,569,897 | A * | 10/1996 | Masuda | 235/379 |
| 5,603,529 | A | 2/1997 | Breindel | 283/56 |
| 5,933,817 | A | 8/1999 | Hucal | 705/39 |
| 5,950,179 | A * | 9/1999 | Buchanan et al. | 705/38 |
| 5,953,710 | A | 9/1999 | Fleming | 705/38 |
| 5,970,478 | A * | 10/1999 | Walker et al. | 705/35 |
| 6,032,136 | A * | 2/2000 | Brake et al. | 705/41 |
| 6,088,686 | A * | 7/2000 | Walker et al. | 705/38 |
| 6,121,565 | A | 9/2000 | Allott, III | 209/584 |
| 6,158,657 | A * | 12/2000 | Hall et al. | 235/380 |
| 6,324,524 | B1 | 11/2001 | Lent et al. | 705/38 |
| 6,405,181 | B2 | 6/2002 | Lent et al. | 705/38 |
| 6,636,833 | B1 * | 10/2003 | Flitcroft et al. | 705/1 |
| 6,915,277 | B1 * | 7/2005 | Manchester et al. | 705/39 |
| 7,047,219 | B1 * | 5/2006 | Martin et al. | 705/37 |
| 2001/0032192 | A1 * | 10/2001 | Putta et al. | 705/76 |
| 2001/0037243 | A1 | 11/2001 | Rouston et al. | |
| 2002/0046065 | A1 | 4/2002 | Nighan | |
| 2002/0173994 | A1 | 11/2002 | Ferguson, III et al. | |
| 2002/0194122 | A1 * | 12/2002 | Knox et al. | 705/39 |
| 2003/0101131 | A1 * | 5/2003 | Warren et al. | 705/38 |
| 2003/0126011 | A1 * | 7/2003 | Bryman et al. | 705/14 |

FOREIGN PATENT DOCUMENTS

WO    WO 01/16896    *   3/2001

(Continued)

OTHER PUBLICATIONS

PrepaidShipping.com, *The Online Shipping Solution*, pp. 1-2, http://www.prepaidshipping.com, Jul. 22, 2002.

(Continued)

*Primary Examiner*—James P. Trammell
*Assistant Examiner*—Sanjeev Malhotra
(74) *Attorney, Agent, or Firm*—Hunton & Williams, LLP

(57) ABSTRACT

According to one embodiment of the invention, a method for providing a higher credit limit to a credit customer is provided. The method includes opening a credit account for a customer. The method also includes determining a first credit limit for the credit account using a credit rating of the customer. The method also includes determining a second credit limit for the credit account using credit information concerning a guarantor. The second credit limit is higher than the first credit limit and coexists with the first credit limit. The method also includes forming an agreement with the guarantor that the guarantor is responsible for paying a portion of an unpaid balance of the credit account that exceeds the first credit limit.

50 Claims, 3 Drawing Sheets

FOREIGN PATENT DOCUMENTS

| WO | WO 02/19217 | * | 3/2002 |
| WO | WO 02/23431 | | 3/2002 |
| WO | WO 02/31733 | | 4/2002 |

OTHER PUBLICATIONS

PrepaidShipping.com, *The Online Shipping Solution*, pp. 1-2, http://www.prepaidshipping.com/tools/faq.html, Jul. 22, 2002.

Community Shores Bank, *Checking*, pp. 1-4, http://www.communityshores.com/Checking/checking.html, Jul. 22, 2002.

PCWorld.com, *Top Tips for Online Banking*, pp. 1-2, 22 http://www.pcworld.com/features/article/0,aid,14816,pg,8,00.asp, Jul. 22, 2002.

"*Discover 2GO$^{SM}$ Card*", product overview, Discover Financial Services, pp. 1-2, www.discover2go.com, Dec. 19, 2002.

* cited by examiner

METHOD AND SYSTEM FOR PROVIDING A HIGHER CREDIT LIMIT TO A CUSTOMER

TECHNICAL FIELD OF THE INVENTION

This invention relates generally to the field of credit transactions and more particularly to a method and system for providing a higher credit limit to a customer.

BACKGROUND OF THE INVENTION

Consumers frequently use credit to make purchases. For example, a consumer may purchase goods or services from a merchant using a line of credit that may be accessed by presenting a credit card to the merchant. A consumer may also make high-priced purchases using various types of loans, such as a mortgage, auto loan, or consumer loan. All of these loans, also referred to as "credit," are generally approved by a financial institution based on the requesting consumer's credit history. For example, the level of credit granted to a consumer depends on the level of financial responsibility demonstrated by the consumer's credit history. Because credit transactions are convenient and pervasive in today's economy, it is important for most consumers to have the ability to obtain credit by establishing and maintaining a good credit history.

Good credit history generally comprises a pattern of responsible credit use. However, one cannot establish such a pattern without first obtaining credit, which generally requires a good credit history. Thus, establishing good credit history may be difficult for consumers with no or bad credit history. For example, a student having no credit history may have difficulty establishing a pattern of responsible credit use because the student may not be able to obtain credit to establish such a pattern. In some cases, such consumers may be eligible for only a limited amount of credit, which may be inconvenient in certain financial emergencies.

SUMMARY OF THE INVENTION

According to one embodiment of the invention, a method for providing a higher credit limit to a credit customer is provided. The method includes opening a credit account for a customer. The method also includes determining a first credit limit for the credit account using a credit rating of the customer. The method also includes determining a second credit limit for the credit account using credit information concerning a guarantor. The second credit limit is higher than the first credit limit and coexists with the first credit limit. The method also includes forming an agreement with the guarantor that the guarantor is responsible for paying a portion of an unpaid balance of the credit account that exceeds the first credit limit.

Some embodiments of the invention provide numerous technical advantages. Some embodiments may benefit from some, none, or all of these advantages. For example, according to one embodiment, a customer is provided with an opportunity to establish a good credit history while having a higher level of credit. In another embodiment, a customer is provided with an opportunity to learn how to manage the customer's own line of credit without a significant risk of adversely affecting the customer's credit history. In another embodiment, a higher level of credit may be provided to a customer without exceeding the level of credit that is commensurate with the customer's financial ability.

Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF EXAMPLE EMBODIMENTS OF THE INVENTION

Embodiments of the invention are best understood by referring to FIGS. 1 through 5 of the drawings, like numerals being used for like and corresponding parts of the various drawings.

Figure 1:
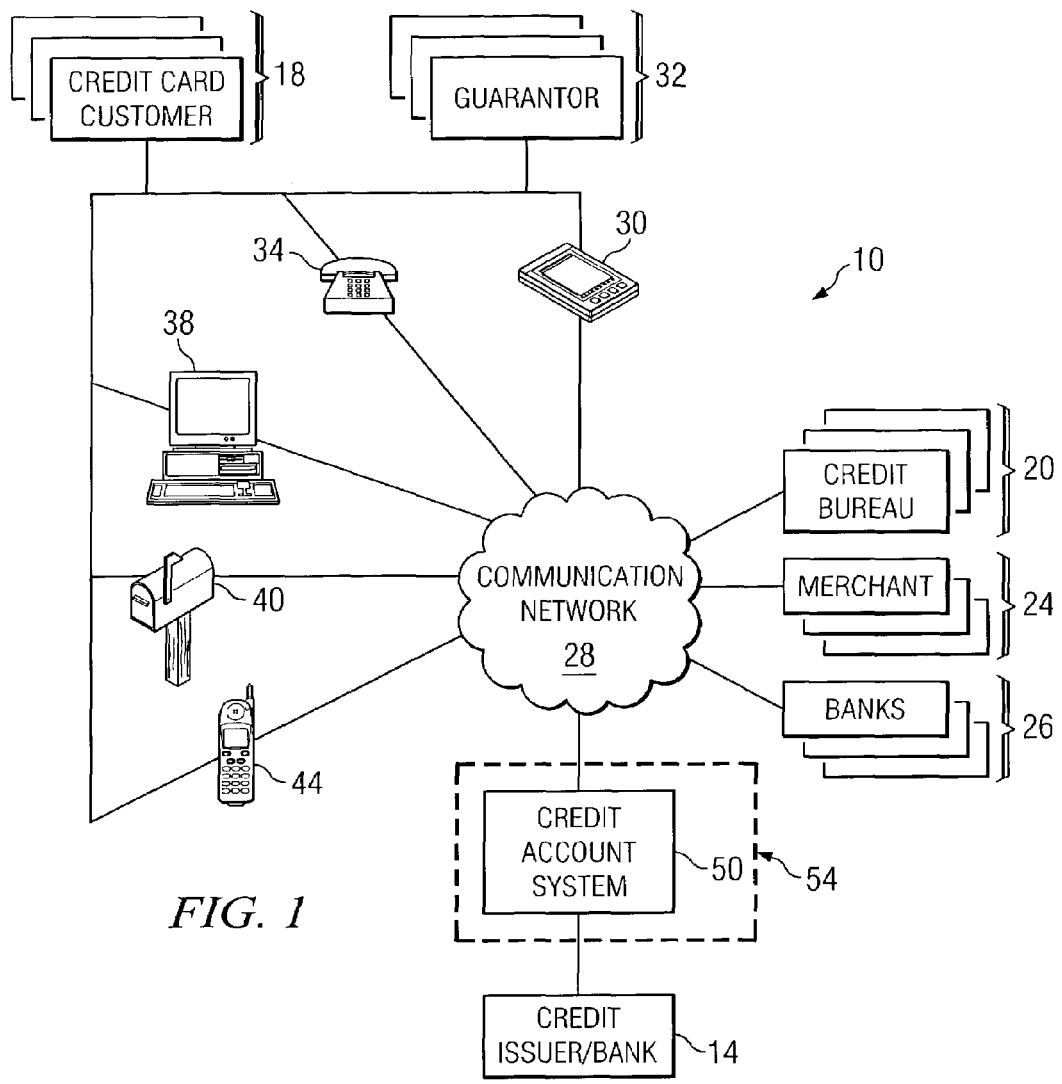
FIG. 1 is a schematic diagram illustrating a credit system incorporating a credit account system according to an embodiment of the present invention.

FIG. 1 illustrates a credit system 10 in accordance with one embodiment of the present invention. Credit system 10 comprises a credit issuer 14, customers 18, credit bureaus 20, and merchants 24 that may be coupled to each other over a communications network 28. Communications network 28 may include one or more computer buses, local area networks (LANs), metropolitan area networks (MANs), wide area networks (WANs), a global computer network such as the Internet, and/or any other appropriate wire line, optical, wireless, or other communication links. Communications network 28 allows credit issuer 14, customers 18, credit bureaus 20, and merchants 24 to communicate with one another using various communication devices. For example, customers 18 may send and/or receive information using a wireless Personal Digital Assistant ("PDA") 30, a telephone 34, a computer 38, regular mail 40, a wireless telephone 44, a television 48, or any other suitable device. Although these devices 30 through 48 are shown as available to customers 18, any credit issuer 14, credit bureau 20, merchant 24, or any other party who is coupled to communications network 28 may use any one or combination of these devices 30 through 48 to communication with one another.

Credit issuer 14 may be any entity, such as an individual or business that may provide a line of credit to one or more customers 18. Examples of credit issuer 14 include a bank, a merchant bank, a credit union, and a retail store. Credit issuer 14 may also be any combination of banks, credit unions, and/or any other entity operable to provide a line of credit to customers 18. An example of credit issuer 14 is Capital One Services, Inc.

Credit issuer 14 may be operable to issue credit cards (not explicitly shown in FIG. 1) and maintain and/or manage credit accounts associated with issued credit cards. Each credit account may include one or more lines of credit. For example, a particular credit account may include a general-purpose credit line that may be used to purchase goods or services from any merchant 24. The credit account may also comprise a private credit line that may be used to purchase goods or services from a single merchant 24 or a limited set of merchants 24. Each credit line may be a revolving credit line. In maintaining and/or managing credit accounts, credit issuer 14 may be operable to issue and terminate credit accounts, establish credit limits, manage outstanding and available balances for each credit account or credit line, and perform other related functions. These functions may be performed based on credit information received from a particular customer 18, one or more credit bureaus 20, and/or credit issuer's 14 own assessment of customer's 18 creditworthiness.

Customer 18 may be any individual or business that may establish a credit account with credit issuer 14, receive a line of credit from credit issuer 14, and use the line of credit in transactions. Customer 18 may hold a credit account alone or jointly with other customers 18. Customer 18 may use the received line of credit by presenting a credit card as a form of payment for transactions. The used portion of the line of credit is indicated in the credit account as a credit card balance. Customers 18 may incur a credit card balance on the credit account in a variety of other ways, such as making purchases using the credit account number, over telephone 34.

Credit bureaus 20 are operable to provide information concerning customers' 18 creditworthiness to credit issuer 14 or other requesting parties. Such information, referred to herein as either "credit information" or "credit history," may include a pattern of credit use, payment information, and any personal information. Personal information may include information concerning occupation, income, home ownership, or any other information that may be relevant in evaluating the creditworthiness of customer 18. Credit issuer 14 may use the credit information received from credit bureaus 20 in processing credit/credit card applications from potential customers 18 and/or in managing credit accounts of existing customers 18. Credit issuer 14 may also use the credit information for conducting any other credit-related transactions with another party who may or may not be a customer 18.

Credit bureaus 20 may be financial clearinghouses or commercial credit bureaus such as Trans Union™, Equifax™, or Experian™. Credit bureau 20 may receive information concerning customer's 18 creditworthiness. For example, credit bureau 20 may receive information regarding a delinquent payment of a particular customer 18 from credit issuers or any other source of such information. Then credit bureau 20 may assemble the received information, along with public record information regarding the credit customer, into a file on customer's 18 credit history. Any credit issuer, such as credit issuer 14, may obtain a credit report concerning any customer 18 from the customer's 18 corresponding file maintained by credit bureaus 20. Many transactions in today's economy are conducted using credit. For example, most homes and automobiles are financed. Because a decision on whether to grant a line of credit or a loan (a mortgage, for example) is based at least in part on a credit report generated from a credit history file, maintaining a clean credit history is important for many customers 18.

Merchants 24 may be any merchant that accepts credit issued to customers 18 as a form of payment for goods or services of any type. Before accepting credit as a form of payment, many merchants 24 may require customer 18 to present a credit card associated with the credit account. Merchant 24 may transmit the information on the credit card, such as the credit card number and the expiration date, to credit issuer 14 or another party to make a verification that the credit account is valid, active, and has an amount of credit that can cover the cost of the transaction. Where customer 18 is not co-located with merchant 24, merchant 24 may not require customer 18 to show a credit card but instead require only the account number of the credit account and the expiration date of the card. Merchant 24 may also accept payments from a general-purpose credit line and/or a private credit line associated with the credit account of customer 18. Credit issuer 14 may establish private credit lines for making purchases from particular merchants 24. For example, where merchant 24 is also credit issuer 14, merchant 24 may provide customer 18 with a credit account including a private credit line that may be used only to make purchases from the merchant 24.

A customer 18 having no credit history or a poor credit history may have difficulty obtaining credit and/or establishing a good credit history because many credit issuers 14 may not issue credit to such customer 18. Customer 18 having no or poor credit history is referred to herein as "a high risk customer 18." An example of high-risk customer 18 is a teenager or a student; however, any customer 18 may be a high-risk customer 18, depending on the particular risk assessment procedure of a particular credit issuer 14. In order to establish a good credit history, high-risk customer 18 is generally required to establish a pattern of responsible credit use, which requires the high customer 18 to obtain credit. However, many credit issuers 14 may refuse to give credit to high-risk customers 14 because their credit rating is too low. "A credit rating" of customer 18 refers to an indication of the customer's 18 trustworthiness regarding the use of credit and subsequent payment of any balance on the credit account of the customer 18. For example, a high credit rating is generally associated with a low risk of defaulting on a loan or a balance payment. A credit rating may be determined using any information concerning customer 18, such as credit history, current employment, and current level of income; however, any suitable method of determining a credit rating may be used.

Some credit issuers 14 may offer a limited line of credit having a high interest rate to high-risk customers 18. Some credit issuers 14 may eliminate or shorten the grace period. A grace period refers to a time period in which a balance may be paid off without incurring interest. However, these credit programs may be too expensive or inconvenient for high-risk customers 18. For example, a line of credit with a high interest rate and/or no grace period may be financially dangerous for high risk customers 18 because a balance that is not completely paid off in one payment cycle may capitalize, eventually becoming an unbearable financial burden for the high risk customer 18. In another example, having only a limited line of credit may be inconvenient for high risk customer 18 who may encounter certain financial emergencies.

Some credit issuers 14 may allow a higher credit limit for high risk customers 18 by requiring a party having a good credit history to be a co-signor for the credit account. Although such a method allows a higher credit limit, it fails to provide a realistic environment to learn responsible credit use because the responsibilities associated with the credit account is spread between the high risk customer and the co-signer. Thus, the high-risk customer 18 may not take the use of credit seriously enough to learn credit management in a realistic setting. This may be especially true for inexperienced high-risk customers, 18, such as teenagers. Further, a credit history established using a line of credit that is managed by both customer 18 and a co-signor may not be viewed as a true credit history of customer 18 by certain credit bureaus 20, merchants 24, and/or banks 26.

According to some embodiments of the present invention, a method, product, and system are provided that allow any customer to establish a good credit history while having a higher level of credit. In one embodiment, a customer is provided with an opportunity to learn how to manage the customer's own line of credit without a significant risk of adversely affecting the customer's credit history. In another embodiment, a higher level of credit may be provided to a customer without exceeding the level of credit that is commensurate with the customer's financial ability. Additional details of example embodiments of the invention are described below in conjunction with FIGS. 1 through 5.

Referring again to FIG. 1, system 10 also includes one or more guarantors 32 and a credit account system 50 that may be accessed by credit issuer 14. In one embodiment, credit account system 50 may comprise one or more computers (not explicitly shown in FIG. 1) that may be used establish and maintain one or more credit accounts for customers 18. Guarantor 32 may be any person or organization that may form an agreement with credit issuer 14 to assume responsibility for paying a portion of any unpaid balance of the credit account associated with high risk customer 18. An example of guarantor 32 may be a parent of high-risk customer 18. Although guarantor 32 may be a customer of credit issuer 14, in some embodiments, guarantor 32 has no direct business association with credit issuer 14. In some embodiments where customer 18 wants to conduct a self-supervision of credit use, customer 18 may be his or her own guarantor 32.

In one embodiment, credit issuer 14 may open a credit account for high-risk customer 18. The credit account includes a line of credit. The line of credit has a first credit limit that is determined using a credit rating of the high-risk customer 18. The credit rating may be determined using any method suitable for the particular business model adopted by credit issuer 14. Then credit issuer 14 may determine a second credit limit that is higher than the first credit limit for the same line of credit. In one embodiment, the second credit limit is determined using credit information concerning a guarantor 32. In one embodiment, rather than setting multiple credit limits on a single line of credit, credit issuer 14 may establish a backup line of credit using credit information concerning guarantor 32. The backup line of credit may be available to high risk customer 18 after the main line of credit, granted using the credit rating of the high risk customer 18, is completely used.

In one embodiment, credit issuer 14 forms an agreement with guarantor 32 that holds the guarantor 32 responsible any unpaid balance that exceeds the first credit limit. In one embodiment, credit issuer 14 forms an agreement with guarantor 32 that holds the guarantor 32 responsible for any balance incurred due to the use of the backup line of credit. In one embodiment, the second credit limit or the backup line of credit is established in response to a request from guarantor 32; however, credit issuer 14 may establish a second credit limit and/or a back up line of credit without a request from guarantor 32. Credit issuer 14 may use a credit account system 50 to establish the credit account that includes some embodiments of the present invention. Additional details of the credit account are described below in conjunction with FIG. 2.

Figure 2:
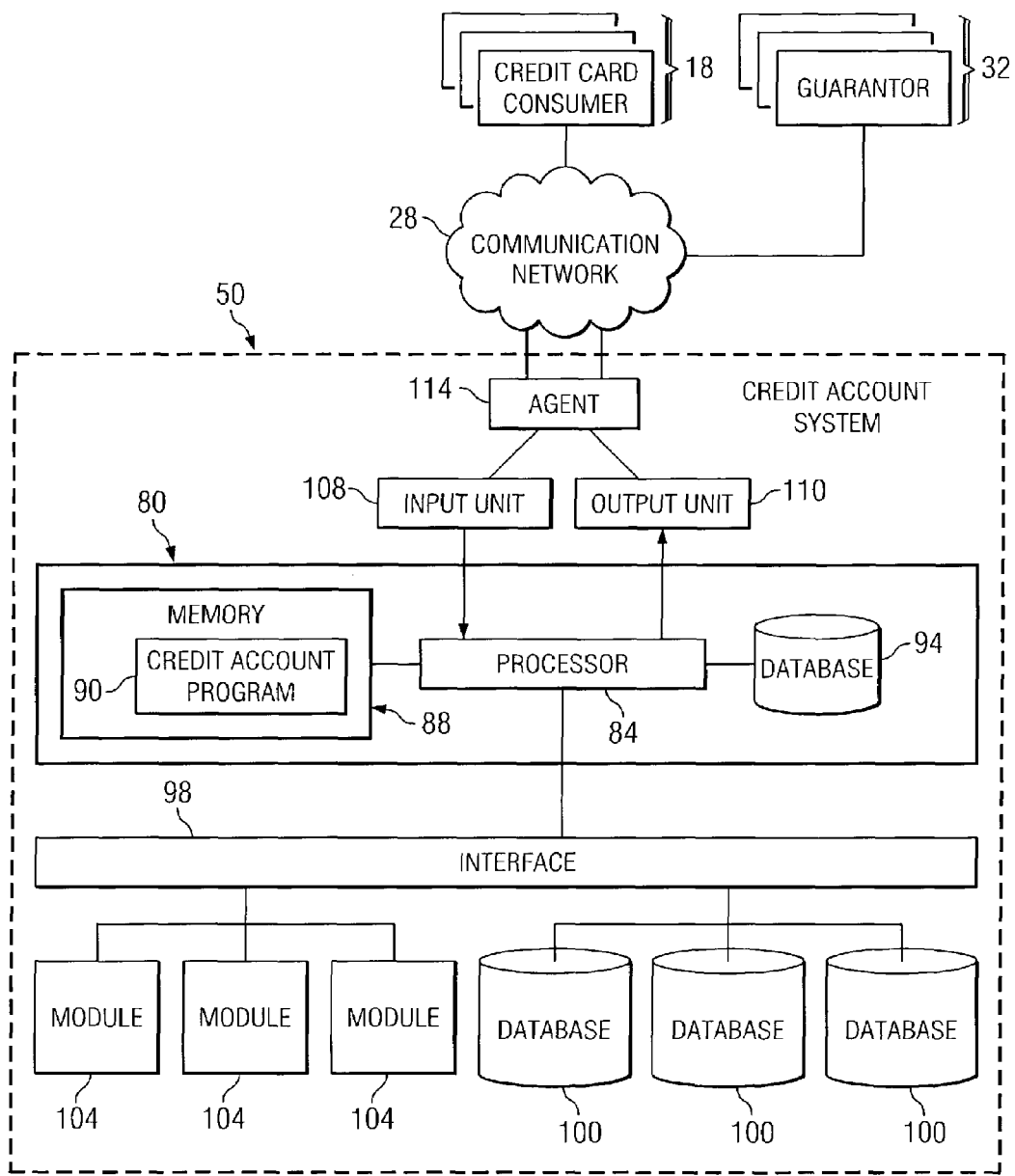
FIG. 2 is a schematic diagram illustrating a credit account system according to an embodiment of the present invention.

FIG. 2 is an illustration of one embodiment of credit account system 50. Credit account system 50, comprises a computer 80 having a processor 84, a memory 88 storing a credit account program 90, and a data storage unit 94 for storing data related to program 90. Credit account system 50 also comprises an input unit 108 and an output unit 110. In some embodiments, credit account system 50 may include an interface 98, one or more data storage units 100 and one or more modules 104. However, computer 80 may be configured such that local data storage unit 94 may store all the data associated with program 90 without using data storage units 100. In some embodiments, data storage units 100 may be included within computer 80; however, data storage units 100 and modules 104 may be located anywhere as long as they are coupled to credit account system 50. In some embodiments of credit account system 50, processor 84 may be operable to perform the functions of modules 104. In such embodiments, modules 104 may not be needed. In some embodiments, credit account system 50 may also include one or more human agents 114 who may have access to input unit 108 and output unit 110. Agent 114 may establish a second credit limit or a second line of credit using computer 80 through input unit 108 and output unit 110. However, in some embodiments of the invention, agent 114 may be omitted.

Processor 84 of computer 80 is coupled to memory 88, local data storage unit 94, input unit 108, and output unit 110. In one embodiment, processor 84 is also coupled to interface 98 that provides one or more communication links between processor 84, data storage units 100, and modules 104. Processor 84 is operable to execute the logic of program 90 and access data stored in both local data storage unit 94 and data storage units 100. Examples of processor 84 are the Pentium™ series processors, available from Intel Corporation.

Memory 88 and data storage units 94 and 100 may comprise files, stacks, databases, or other suitable forms of data. Memory 88 and data storage units 94 and 100 may be random access memory, read only memory, CD-ROM, removable memory devices, or any other suitable device that allows storage and/or retrieval of data. Memory 88 and data storage units 94 and 100 may be interchangeable and may perform the same functions.

In one embodiment, credit account program 90 is a program, when executed using processor 84, that is operable to establish a credit account for customer 18, determine a first credit limit for the credit account using a credit rating of customer 18, determine a second credit limit for the credit account using credit information of guarantor 32, and initiate a notification to the guarantor that the guarantor is responsible for paying a portion of the unpaid balance that exceeds the first credit limit and equal to or less than the second credit limit. In one embodiment, the second credit limit is higher than the first credit limit. In one embodiment, the second credit limit may be omitted and the guarantor may be responsible for paying any portion of the unpaid balance that exceeds the first credit limit. In one embodiment, program 90 may be operable to establish a backup line of credit using credit information concerning guarantor 32 rather than establishing a plurality of credit limits for the main line of credit. The main line of credit refers to the line of credit established using the credit rating of customer 18. In one embodiment, program 90 may be operable to determine the first credit limit using only the credit rating of high-risk customer 18 and not the credit rating of guarantor 32 or any other party. In one embodiment, program 90 may also be operable to determine the second credit limit for the credit account using only the credit information of guarantor 32. In one embodiment, program 90 may be operable to determine the second credit limit using the combined credit information of customer 18 and guarantor 32.

In one embodiment, program 90 may determine the credit rating of customer 18 by receiving any pertinent information from any credit bureau 20. Program 90 may also be operable to receive credit information concerning guarantor 32 from any one of credit bureaus 20 and determine the credit rating of guarantor 32. In one embodiment, program 90 may present credit information of customer 18 and/or guarantor 32 to agent 114 who may make a credit rating determination. Program 90 may be operable to initiate the notification to guarantor 32 of the guarantor's 32 responsibilities by directing one or more of modules 104 to generate an agreement, such as a contract, and send the agreement over communications network 28. For example, an agreement listing the responsibilities of guarantor may be generated on paper and mailed to guarantor 32 using regular mail 40; however, the agreement may also be sent to guarantor 32 using any other suitable method, such as providing an electronic copy of the agreement over email or by way of a web site.

Although FIG. 2 shows program 90 as a software program, program 90 may also be programmed in a variety of hardware, such as a digital signal processor, application specific integrated circuit, or any other suitable hardware. Program 90 may be written in any suitable language, including C or C++.

Interface 98 provides an interface between computer 80 and any external devices, such as database 100, module 104, or any other devices. Modules 104 may perform various functions of credit account system 50. However, in some embodiments, computer 80 may perform all of the functions of modules 104. In one embodiment, module 104 may be a computer having analogous components as computer 80; however, other devices or systems operable to perform a particular function for providing a higher amount of credit may also be used. In one embodiment, one of modules 104 may open a credit account for high-risk customer 18 using a credit rating of the high-risk customer 18. The credit rating may be determined using credit information concerning the high-risk customer at the module 104 or other modules 104. Then, another one of modules 104 may establish either a second credit limit for the same credit account or a backup line of credit. Information concerning the second credit limit and/or the backup line of credit may be communicated to processor 84 over interface 98 for presentation agent 114.

Input unit 108 may be any device that is operable to provide input for processor 84. Examples of input unit 108 are a keyboard, a mouse, or an audio-digital translator that translates tones into digital signals for transmission to processor 84. Such a translation device may be implemented in some embodiments of the invention where guarantor 32 may communicate with credit issuer 14 using telephone 34 and enter some of the relevant information using a key pad of telephone 34. Output unit 110 may be any device that is operable to display information from processor 84. Examples of output unit 110 include a monitor of any type, a speaker, or a printer.

Figure 3:
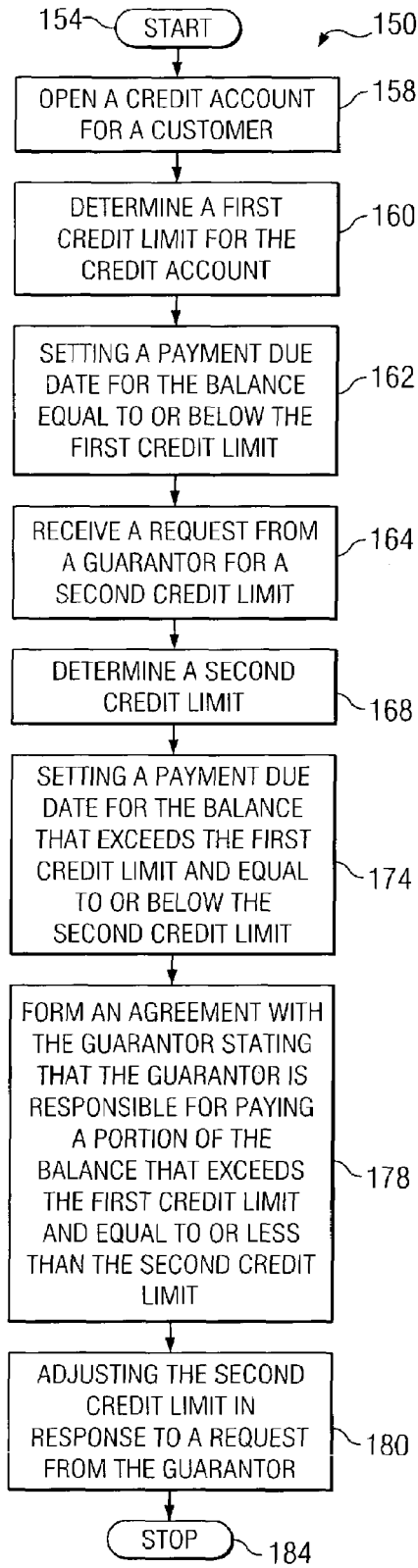
FIG. 3 is a flow chart illustrating an embodiment of a method for providing a higher credit limit to a customer.

FIG. 3 is a flow chart illustrating one embodiment of a method 150 for providing a higher credit limit for customer 18. In one embodiment, some portions or all of method 150 may be performed using program 90. Method 150 starts at step 154. At step 158, credit issuer 14 opens a credit account for a customer 18, such as a high-risk customer 18. At step 160, credit issuer 14 determines a first credit limit for the credit account. The first credit limit may be determined using any risk assessment method that may be appropriate for the particular business model of credit issuer 14. In some embodiments, the first credit limit is determined using only the credit rating that is associated with customer 18 and not the credit information of any other party, such as a guarantor. At step 162, credit issuer 14 sets a payment due date for the balance that is equal to or below the first credit limit.

Determining a first credit limit using the credit rating of high risk customer 18 is advantageous in some embodiments because the high risk customer 18 may feel a sense of ownership towards the line of credit. A sense of ownership may motivate high risk customer 18 to take the responsibilities associated with the line of credit more seriously, which increases the probability of credit management success for the high risk customer 18. The sense of ownership may also create a more realistic credit management experience for the high risk customer 18 because the responsibility associated with the management of the credit up to the first credit limit is solely associated with the high risk customer 18, and not a third party. Further, any history established by the use of the line of credit up to the first credit limit is more likely to be considered as an accurate demonstration of the high-risk customer's 18 ability to manage credit and thus taken more seriously by credit bureaus 20, merchants 24, banks 26, and other entities.

At step 164, credit issuer 14 receives a request from guarantor 32 to establish a second credit limit for the same credit account established at step 160. In some embodiments, at step 164, credit issuer 14 may establish a second credit limit in response to an indication that a guarantor 32 is available to take responsibility for any balance that exceeds the first credit limit and equal to or below the second credit limit. In some embodiments, at step 164, guarantor 32 may request a specific amount to be used as the second credit limit.

At step 168, credit issuer 14 determines a second credit limit for the credit account established at step 160. The established second credit limit may be equal to or below the amount that was requested by guarantor 32, depending on the credit rating of the guarantor 32. In some embodiments, the second credit limit is determined using only the credit information associated with guarantor 32 and not the credit information of customer 18. At step 174, credit issuer 14 sets a payment due date for the balance that exceeds the first credit limit and is equal to or less than the second credit limit. In some embodiments, step 174 may be omitted. In some embodiments, the payment due date of step 162 may be earlier than the payment due date that of step 174. For example, if the payment due date for the balance equal to or below the first credit limit is due on the $20^{th}$ of each month, then the payment due date for the balance that exceeds the first credit limit may be due at the end of the month. This is advantageous in some embodiments of the invention because it allows a grace period for guarantor 32 to make a payment to cover the balance that exceeds the first credit limit without paying any interest or adversely affecting the credit history of customer 18, which may encourage more guarantors to help high risk customers 18.

At step 178, credit issuer 14 forms an agreement with guarantor 32 stating that the guarantor is responsible for paying a portion of the balance that exceeds the first credit limit and equal to and less than the second credit limit. In one embodiment, guarantor 32 is the only one who is responsible for the amount that exceeds the first credit limit. In another embodiment, guarantor 32 and customer 18 may be jointly responsible for the balance that exceeds the first credit limit.

Making a second credit limit available is advantageous because such a credit limit allows customer 18 to make credit mistakes, such as overcharging, without hurting the customer's 18 credit history. Further, the portion of the credit line between the first credit limit and the second credit limit may operate as a safety net that may be used by customer 18 in an emergency situation.

At step 180, credit issuer 14 may adjust the second credit limit in response to a request from guarantor 32. In some embodiments, this is advantageous because such an adjustment allows guarantor 32 to supervise and control the use of credit by high-risk customer 18. For example, if customer 18 needs more credit to pay for an emergency auto repair, then guarantor 32 may allow credit issuer 14 to make more credit available by communicating a request to credit issuer 14 over communications network 28 to increase the second credit limit. In another example, if guarantor 32 determines that the existing second credit limit is too high for any reason, then guarantor 32 may inform credit issuer 14 to reduce or even eliminate the second credit limit. In one embodiment, step 180 may be omitted.

In one embodiment, steps 164 through 178 may be repeated for each of multiple guarantors 32. For example, steps 164 through 178 may be performed for a first guarantor 32 who is a parent of the high-risk customer 18. Then steps 164 through 178 may be performed again for a second guarantor 32 who is a grandparent of the high-risk customer 18. After credit issuer 14 establishes a second credit limit, credit issuer 14 may receive a request from a second guarantor 32 to establish a third credit limit for the same high risk customer 18 at step 164. Credit issuer 14 determines a third credit limit using the credit rating of second guarantor 32 at step 168. At step 174, a particular payment date may be set for any balance between the second and the third credit limits. At step 178, credit issuer 14 and second guarantor 32 forms an agreement that the second guarantor 32 is responsible for paying any balance between the second and the third credit limits. In another embodiment, the second guarantor and the high-risk customer 18 may be jointly responsible for the payment. Method 150 stops at step 184.

In one embodiment, when a transaction requires an amount of credit that exceeds the first credit limit, credit issuer 14 may inform a payee, such as merchant 24, that the transaction requires the activation of the second line of credit. Payee then informs customer 18 of the same, and further inquires whether customer 18 wants to proceed with the transaction. In one embodiment, credit issuer 14 may communicate the information directly to customer 18 using any suitable method, such as cellular phone 44 or a credit card verification device that is accessible to customer 18 at a place of purchase. This is advantageous in some embodiments of the invention because customer 18 is given an opportunity to make a responsible purchase decision. For example, if the transaction is not an important purchase, customer 18 may decline to proceed with the purchase because such a purchase may require an involvement by guarantor 32. However, if the transaction is an important purchase, then customer 18 may use the second line of credit. In some embodiments where customer 18 is his or her own guarantor 32, customer 18 may use such information provided by credit issuer 14 to better control the use of credit. For example, if the first credit limit is set to equal a certain monthly budget, then customer 18 may decline to proceed with a purchase that would exceed the first credit limit. This is advantageous because customer 18 is provided with an opportunity to stop credit expenditure after it reaches a planned amount rather than finding out at the end of a payment cycle that the planned amount has been exceeded, which may place customer 18 in a financial difficulty. In one embodiment, the second credit limit may be omitted and guarantor 32 may be responsible for paying any portion of the unpaid balance that exceeds the first credit limit. This is advantageous because an unlimited line of credit may be available to customer 18 despite customer's 18 low credit rating.

Figure 4:
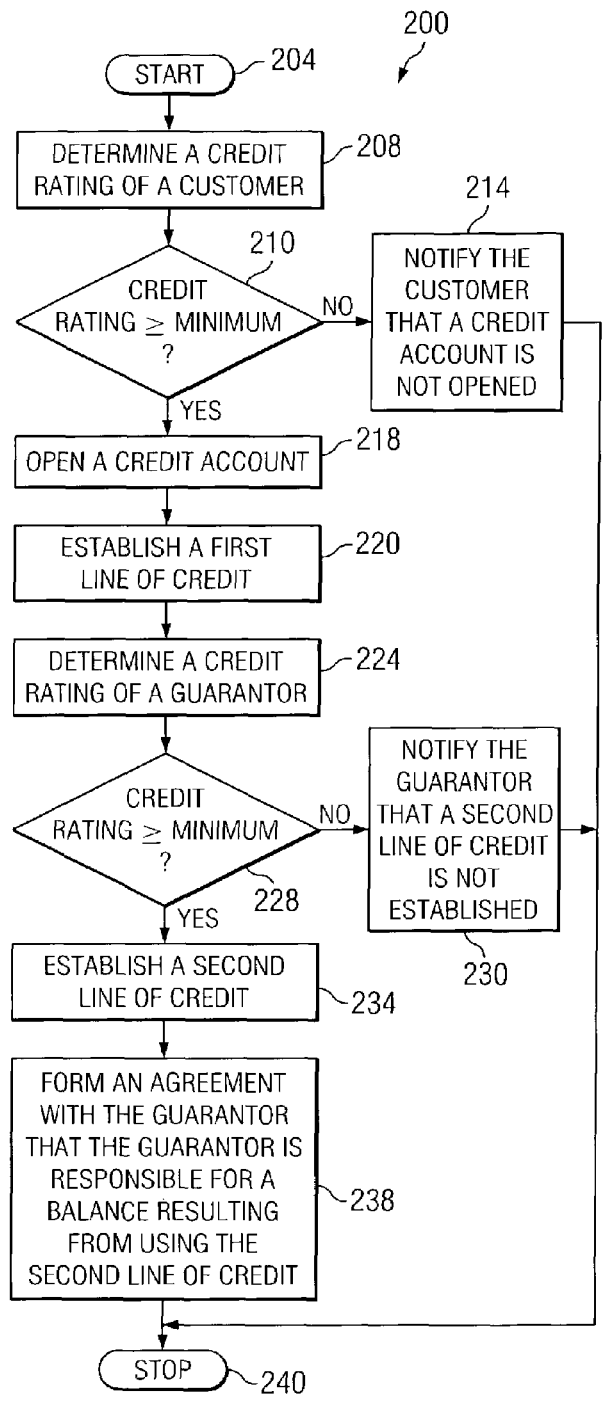
FIG. 4 is a flow chart illustrating an embodiment of a method for providing a higher credit limit to a customer.

FIG. 4 is a flow chart illustrating one embodiment of a method 200 for providing a higher level of credit to a customer 18. In one embodiment, some portions or all of method 200 may be performed using program 90. Method 200 starts at step 204. At step 208, credit issuer 14 may determine a credit rating of customer 18 using credit information concerning the customer 18. Credit information may be received from credit bureaus 20, merchants 24, banks 26, or any other entities. Credit issuer 14 may determine a credit rating of customer 18 using any suitable method that is appropriate for the particular business model adopted by the credit issuer 14. At decision step 210, credit issuer 14 determines whether the credit rating determined at step 208 is greater than or equal to a particular minimum standard. The minimum standard may be set at a level that represents the credit issuer's 14 risk tolerance. If the credit rating is less than the minimum standard, then the "no" branch is followed to step 214 where credit issuer 14 initiates a notification to customer 18 stating that a credit account is not opened. If the credit rating is greater than or equal to the minimum standard, then the "yes" branch is followed to step 218 where credit issuer 14 opens a credit account for customer 18. At step 220, credit issuer 14 establishes a first line of credit. In one embodiment, the first line of credit is established using only the credit rating of customer 18. At step 224, a credit rating of guarantor 32 is determined by credit issuer 14 using credit information concerning the guarantor 32. A credit rating of guarantor 32 may be determined by credit issuer 14 using any method suitable for the particular business model adopted by credit issuer 14.

At decision step 228, the credit rating of guarantor 32 is compared to another minimum standard to determine whether the credit rating exceeds or is equal to the minimum standard. In one embodiment, the minimum standard of step 228 may be approximately equal to the minimum standard of step 210. If the credit rating is less than the minimum standard, then method 200 proceeds to step 230 where credit issuer 14 initiates a notification to guarantor 32 indicating that a second line of credit is not established. If the credit rating is equal to or greater than the minimum standard, then "yes" branch is followed to step 234 where a second line of credit is established for the same credit account established at step 218. In one embodiment, the second line of credit may be associated with a separate credit account. In one embodiment, regardless of whether the second line of credit is associated with the credit account opened for customer 18 at step 218 or another account, the second line of credit becomes available to customer 18 when the first line of credit is completely expended. In one embodiment, guarantor 32 may specify the amount of credit that may be established as the second line of credit.

At step 238, credit issuer 14 forms an agreement with guarantor 32 that guarantor 32 is responsible for paying off the balance that results from using the second line of credit. In one embodiment, guarantor 32 may adjust the amount available for the second line of credit by communicating such intent to credit issuer 14.

In one embodiment, steps 224 through 238 may be repeated for each of multiple guarantors 32. For example, steps 224 through 238 may be performed for a first guarantor 32 who is a parent of the high-risk customer 18. Then steps 224 and 238 may be performed again for a second guarantor 32 who is a grandparent of the high-risk customer 18. After first guarantor 32 establishes a second line of credit for high risk customer 18, second guarantor 32 may request a third line of credit to be established for the same high risk customer 18. Credit issuer 14 determines the credit rating of second guarantor 32 at step 224 and compares the determined credit rating to a minimum standard at step 228. If the credit rating is equal to or greater than the minimum standard, then a third line of credit is established at step 234. At step 238, credit issuer 14 and second guarantor 32 forms an agreement that the second guarantor 32 is responsible for paying any balance that results from the use of the third line of credit. In another embodiment, the second guarantor and the high-risk customer 18 may be jointly responsible for the payment. In one embodiment, the third line of credit may be available to high-risk customer 18 after the second line of credit or the first line of credit is completely expended. The order of availability regarding the multiple lines of credit may vary depending on the request of guarantors 32 and/or the preference of credit issuer 14. Method 200 stops at step 240.

In one embodiment, when a transaction requires the availability of the second line of credit, credit issuer 14 may inform a payee, such as merchant 24, that the transaction requires the activation of the second line of credit. Payee then informs customer 18 of the same, and further inquires whether customer 18 wants to proceed with the transaction. In one embodiment, credit issuer 14 may communicate the information directly to customer 18 using any suitable method, such as cellular phone 44 or a credit card verification device that is accessible to customer 18 at a place of purchase. This is advantageous in some embodiments of the invention because customer 18 is given an opportunity to make a responsible purchase decision. For example, if the transaction is not an important purchase, customer 18 may decline to proceed with the purchase because such a purchase may require an involvement by guarantor 32. However, if the transaction is an important purchase, then customer 18 may use the second line of credit. In some embodiments where customer 18 is his or her own guarantor 32, customer 18 may use such information provided by credit issuer 14 to better control the use of credit. For example, if the first line of credit is set to equal a certain monthly budget, then customer 18 may decline to proceed with a purchase that would exceed the first line of credit. This is advantageous because customer 18 is provided with an opportunity to stop credit expenditure after it reaches a planned amount rather than finding out at the end of a payment cycle that the planned amount has been exceeded, which may place customer 18 in a financial difficulty. In one embodiment, the second credit limit may be omitted and guarantor 32 may be responsible for paying any portion of the unpaid balance that exceeds the first credit limit. This is advantageous because an unlimited line of credit may be available to customer 18 despite customer's 18 low credit rating.

Figure 5:
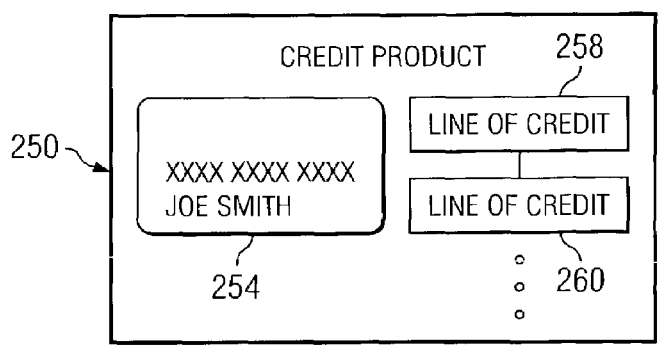
FIG. 5 is a block diagram illustrating an embodiment of a credit product incorporating a credit account that provides a higher credit limit to a customer.

FIG. 5 is a block diagram illustrating one embodiment of a credit product 250. Credit product 250 comprises a credit card 254 that is associated with a first line of credit 258 and a second line of credit 260. In one embodiment, other lines of credit may be associated with credit card 254. Credit card 254 is associated with the credit account of customer 18 and bears the account number and customers 18 name on the face of credit card 254, in one embodiment. In one embodiment, the maximum amount of line of credit 258 is represented by a first credit limit and the sum of lines of credit 258 and 260 may be represented by the second credit limit. In one embodiment, one line of credit 258 may comprise a first credit limit and a second credit limit, where the second credit limit represents the maximum amount of the line of credit 258.

In some embodiments, credit product 250 provides an opportunity for a customer to establish a good credit history while having a higher level of credit. In another embodiment, credit product 250 may operate as a training tool that allows a customer to learn how to manage the customer's 18 own line of credit without a significant risk of adversely affecting the customer's credit history. In another embodiment, credit product 250 provides a higher level of credit to a customer without exceeding the level of credit that is commensurate with the customer's financial ability by providing a second credit limit and/or a second line of credit.

Although some embodiments of the present invention has been described in detail, it should be understood that various changes, substitutions, and alterations can be made hereto without departing from the spirit and scope of the invention as defined by the appended claims.

What is claimed is:

1. A method for providing a first credit limit and a second credit limit for a credit account associated with a credit customer, comprising:

opening the credit account for the credit customer;

determining the first credit limit for the credit account using only a credit rating of the credit customer;

receiving a request for an additional credit limit for the credit account from a guarantor other than the credit customer, wherein the additional credit limit increases a total credit limit to an amount greater than the first credit limit;

determining the second credit limit for the credit account using credit information concerning the guarantor and the additional credit limit requested by the guarantor, wherein the second credit limit increases the total credit limit to an amount greater than the first credit limit, the second credit limit comprises an amount that is equal to or less than the additional credit limit by the guarantor, and the second credit limit simultaneously coexists with the first credit limit; and forming an agreement with the guarantor that the guarantor is responsible for paying a portion of an unpaid balance of the credit account that exceeds the first credit limit and is equal to or less than the second credit limit.

2. The method of claim 1, wherein the credit account comprises a single line of credit, and the first credit limit and the second credit limit are both associated with the single line of credit.

3. The method of claim 1, further comprising:

after forming the agreement, adjusting the second credit limit in response to an adjustment request from the guarantor.

4. The method of claim 1, further comprising:

after forming the agreement, lowering the second credit limit in response to an adjustment request from the guarantor.

5. The method of claim 1, further comprising:

establishing, for the guarantor, a first payment due date for paying the portion of the unpaid balance; and establishing, for the credit customer, a second payment due date for paying a remaining portion of the balance, the remaining portion being equal to or less than the first credit limit.

6. The method of claim 5, further comprising sending a notification to both the credit customer and the guarantor indicating that the portion of the credit balance is due by the established first payment due date.

7. The method of claim 6, wherein the second payment due date is prior to the first payment due date.

8. The method of claim 1, further comprising informing the credit customer during a purchase transaction that the first credit limit is reached.

9. The method of claim 1, further comprising informing the guarantor that the first credit limit is reached prior to a payment due date associated with the guarantor.

10. A method for providing a first credit limit and a second credit limit for a credit account associated with a credit customer, comprising:

opening the credit account for the credit customer;

determining the first credit limit for the credit account using a credit rating of the credit customer;

determining the second credit limit for the credit account using credit information concerning a guarantor other than the credit customer, wherein the second credit limit increases a total credit limit to an amount greater than the first credit limit and the second credit limit simultaneously coexists with the first credit limit; and forming an agreement with the guarantor that the guarantor is responsible for paying a portion of an unpaid balance of the credit account that exceeds the first credit limit.

11. The method of claim 10, wherein the portion of the unpaid balance of the credit account is equal to or less than the second credit limit.

12. The method of claim 10, wherein determining a first credit limit comprises determining a first credit limit without using the credit information concerning the guarantor.

13. The method of claim 10, wherein the second credit limit is equal to a limit amount requested by the guarantor.

14. The method of claim 10, further comprising receiving a request from the guarantor to set the second credit limit at a particular limit amount, and wherein the second credit limit is less than the particular limit amount.

15. The method of claim 10, wherein the credit account comprises a single line of credit that is associated with both the first credit limit and the second credit limit, the second credit limit representing the maximum amount of the single line of credit.

16. The method of claim 10, wherein the credit account comprises a first line of credit and a second line of credit, the second line of credit available to the customer only after the first line of credit is completely used, and wherein the first credit limit represents the maximum amount of the first line of credit and the second credit limit represents a sum of the first line of credit and the second line of credit.

17. The method of claim 10, further comprising adjusting the second credit limit in response to an adjustment request from the guarantor.

18. The method of claim 10, further comprising:
establishing, for the guarantor, a first payment due date for paying the portion of the unpaid balance; and
establishing, for the credit customer, a second payment due date for paying a remaining portion of the balance, the remaining portion being equal to or less than the first credit limit.

19. The method of claim 18, further comprising sending a notification to both the credit customer and the guarantor indicating that the portion of the credit balance is due by the established first payment due date.

20. The method of claim 19, wherein the second payment due date is prior to the first payment due date.

21. The method of claim 19, wherein the first payment due date is prior to the second payment due date.

22. The method of claim 10, further comprising informing the credit customer during a purchase transaction that the first credit limit is reached.

23. The method of claim 10, further comprising informing the guarantor that the first credit is reached prior to a payment due date associated with the guarantor.

24. A method for providing a first credit limit for a credit account associated with a credit customer, comprising:
opening the credit account for the credit customer;
determining the first credit limit for the credit account using a credit rating of the credit customer;
establishing, in response to a request from a guarantor other than the credit customer, an agreement with the guarantor that the guarantor is responsible for paying a portion of an unpaid balance of the credit account that exceeds the first credit limit and not responsible for paying a remaining portion of any unpaid balance that is equal to or less than the first credit limit.

25. A method of claim 24, further comprising determining a second credit limit for the credit account using credit information concerning the guarantor, wherein the second credit limit increases a total credit limit to an amount greater than the first credit limit and the second credit limit simultaneously coexists with the first credit limit, and wherein the guarantor is not responsible for paying an excess portion of the unpaid balance that exceeds the second credit limit.

26. The method of claim 25, wherein determining a first credit limit comprises determining a first credit limit without using the credit information concerning the guarantor.

27. The method of claim 25, wherein the second credit limit is equal to a limit amount requested by the guarantor.

28. The method of claim 25, further comprising:
after forming an agreement, adjusting the second credit limit in response to an adjustment request from the guarantor.

29. The method of claim 25, further comprising:
after forming an agreement, lowering the second credit limit in response to an adjustment request from the guarantor.

30. The method of claim 25, further comprising:
establishing, for the guarantor, a first payment due date for paying the portion of the unpaid balance; and
establishing, for the credit customer, a second payment due date for paying the remaining portion of the balance.

31. The method of claim 30, further comprising sending a notification to both the credit customer and the guarantor indicating that the portion of the credit balance is due by the established first payment due date.

32. The method of claim 31, wherein the second payment due date is prior to the first payment due date.

33. The method of claim 24, further comprising informing the credit customer during a purchase transaction that the first credit limit is reached.

34. The method of claim 24, further comprising informing the guarantor that the first credit is reached prior to a payment due date associated with the guarantor.

35. A system for providing a first credit limit and a second credit limit for a credit account associated with to a credit customer, comprising:
a computer system having a processor;
a computer readable medium coupled to the computer system, the computer readable medium comprising a program operable, when executed on the processor, to:
establish the credit account for the credit customer;
determine the first credit limit for the credit account using a credit rating of the credit customer;
determine the second credit limit for the credit account using credit information concerning a guarantor other than the credit customer, wherein the second credit limit increases a total credit limit to an amount greater than the first credit limit and the second credit limit simultaneously coexists with the first credit limit; and
initiate a notification to the guarantor that the guarantor is responsible for paying a portion of an unpaid balance of the credit account that exceeds the first credit limit.

36. The system of claim 35, wherein the portion of the unpaid balance of the credit card is equal to or less than the second credit limit.

37. The system of claim 35, wherein determining a first credit limit comprises determining a first credit limit without using the credit information concerning the guarantor.

38. The system of claim 35, wherein the program is further operable to receive a request from the guarantor to set the second credit limit at a particular limit amount, and wherein the second credit limit is equal to or less than the particular limit amount.

39. The system of claim 35, wherein the credit account is a credit card account.

40. The system of claim 35, wherein the program is further operable to receive an adjustment request from the guarantor and, in response, lower the second credit limit.

41. The system of claim 35, wherein the program is further operable to:
  set a first payment due date for paying the portion of the unpaid balance; and
  set a second payment due date for a remaining portion of the balance, the remaining portion equal to or less than the first credit limit.

42. The system of claim 41, wherein the second payment due date is prior to the first payment due date.

43. The system of claim 35, wherein the program is further operable to initiate a communication to the credit customer during a purchase transaction, the communication indicating that the first credit limit is reached.

44. The system of claim 35, wherein the program is further operable to inform the guarantor, prior to a payment due date associated with the guarantor, that the first credit limit is reached.

45. A method for providing a first credit limit and a second credit limit for a credit account associated with a credit customer, comprising:
  opening the credit account for the credit customer;
  establishing the first line of credit for the credit account using a credit rating of the credit customer;
  establishing the second line of credit for the credit account using credit information concerning a guarantor other than the credit customer, wherein the second line of credit is available only after the first line of credit is completely used, the second line of credit simultaneously coexisting with the first line of credit; and
  forming an agreement with the guarantor that the guarantor is responsible for paying a portion of an unpaid balance of the credit account that results from using the second line of credit.

46. The method of claim 45, wherein the first line of credit is established without using the credit information concerning the guarantor.

47. The method of claim 45, further comprising receiving a request from the guarantor to establish the second line of credit at a particular amount, and wherein the second line of credit is equal or less than the particular amount.

48. The method of claim 45, further comprising reducing the second line of credit in response to an adjustment request from the guarantor.

49. The method of claim 45, further comprising informing the credit customer during a purchase transaction that the purchase transaction requires the second line of credit to be activated.

50. The method of claim 45, further comprising informing the guarantor that the second line of credit is activated prior to a payment due date associated with the guarantor.

* * * * *